United States Patent

Liang

[11] Patent Number: 5,995,993
[45] Date of Patent: Nov. 30, 1999

[54] SERIAL IN-CIRCUIT EMULATOR

[75] Inventor: C. J. Liang, Hsinchu Hsien, Taiwan

[73] Assignee: Winbond Electronics Corporation, Hsinchu, Taiwan

[21] Appl. No.: 09/003,064

[22] Filed: Jan. 5, 1998

[30] Foreign Application Priority Data

Nov. 14, 1997 [TW] Taiwan ................................. 86117050

[51] Int. Cl.$^6$ ...................................................... G06F 7/00
[52] U.S. Cl. ............................................................ 708/525
[58] Field of Search ............................... 708/525; 712/5, 712/39, 42, 43; 714/34, 734, 726, 727, 729

[56] References Cited

U.S. PATENT DOCUMENTS

| | | | |
|---|---|---|---|
| 4,608,660 | 8/1986 | Hasebe | ........................................ 708/525 |
| 4,890,253 | 12/1989 | Jabusch et al. | ........................... 708/525 |
| 5,748,515 | 5/1998 | Glass et al. | ............................... 708/525 |

*Primary Examiner*—Tan V. Mai
*Attorney, Agent, or Firm*—Fish & Richardson P.C.

[57] ABSTRACT

To debug software programs, an economical and efficient serial in-circuit emulator (ICE) according to the invention can pause the operation of a CPU to read/write current data from/to a register of the CPU or to modify the current data in a register of the CPU. Furthermore, this serial in-circuit emulator can also read/write current data from/to an external memory or other external devices, or modify these data. The CPU mentioned above has an instruction register and a debugging register which allows the serial in-circuit emulator to read/write required data. This serial in-circuit emulator, which comprises a serial in-circuit emulator control register, a serial in-circuit emulator address register and a serial data input/output terminal, can be easily integrated with the CPU without affecting the operating speed thereof as well as has all functions that conventional serial in-circuit emulators should provide.

25 Claims, 8 Drawing Sheets

SERIAL IN-CIRCUIT EMULATOR

BACKGROUND OF THE INVENTION

1. Field of the Invention

The invention relates to a serial in-circuit emulator architecture, and in particular to a serial in-circuit emulator which can be readily integrated with CPUs without affecting the operating speed thereof.

2. Description of Related Art

Generally, to debug software programs, a conventional serial in-circuit emulator (ICE) can pause the operation of a CPU to check, access or modify the status of the CPU. Furthermore, this serial in-circuit emulator can also read/write current data from/to an external memory or other I/O devices, or modify these data. Besides, the serial in-circuit emulator can also change the process of running software programs from a continuously-executing mode into a step-by-step executing mode so as to monitoring the status changing step-by-step. The conventional serial in-circuit emulator is mostly based on "IEEE Standard 1149.1 (JTAG) ." However, while a general CPU is integrated with such conventional serial in-circuit emulator or a serial in-circuit interface, several disadvantages are encountered:

(1) A scan chain must be added on original I/O pins and specific internal registers. That is, multiplexers and scan-type flip-flops should be added on I/O pins or specific internal registers;

(2) Since a serial in-circuit emulator need to be integrated with different types of CPUs, the serial in-circuit emulator must be appropriately modified, resulting in increasing the development time for CPUs;

(3) Due to increasing the functions of the serial in-circuit emulator, the number of I/O pins of original CPU should be increased about 4–5 pins; and (4) Although there may be several very simple serial in-circuit emulators, they can not provide all necessary functions that general serial in-circuit emulators should have. For example, some specific status inside the CPUs can not be accessed, or a hardware single-stepping may not be supported.

SUMMARY OF THE INVENTION

In view of the above, the object of the invention is to provide an economical and efficient serial in-circuit emulator architecture which can easily achieve all necessary functions that conventional serial in-circuit emulators should provide. To debug software programs, a serial in-circuit emulator (ICE) according to the invention can pause the operation of a CPU to access any resources of the CPU. Furthermore, this serial in-circuit emulator can also access external memory or I/O devices when CPU has been halted. Besides, the serial in-circuit emulator can change the process of running software programs from a continuously-executing mode into a step-by-step executing mode and monitoring the changing of CPU resources. This serial in-circuit emulator according to the invention comprises a serial in-circuit emulator control register, a serial in-circuit emulator address register and a serial data input/output terminal. In addition, this serial in-circuit emulator can be easily integrated with a CPU without affecting operating speed thereof, and has all the functions that conventional serial in-circuit emulators provide.

The CPU with the following 4 requirements can easily integrate the invention without need to change any original design.

(1) have a pipeline design;

(2) have a halt status which can be accessed from outside;

(3) allow the instruction register of the CPU to be updated from outside; and (4) have a debugging register which can be accessed externally, that is, the internal status of the CPU can be accessed via the debugging register.

All CPUs which meet the above-mentioned conditions can be directly combined with the serial in-circuit emulator of the invention without modifying the original design of each CPU.

Since the serial in-circuit emulator according to the invention can be integrated with CPUs having different types of pipeline designs, without modifying the original design of each CPU, the operating speed of these CPUs can not be affected. Furthermore, this serial in-circuit emulator requires a modest amount of hardware resources. Basically, this serial in-circuit emulator merely requires a serial in-circuit emulator control register and a serial in-circuit emulator address register. Therefore, after the serial in-circuit emulator is integrated with a CPU, the cost of an entire chip is hardly increased at all.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
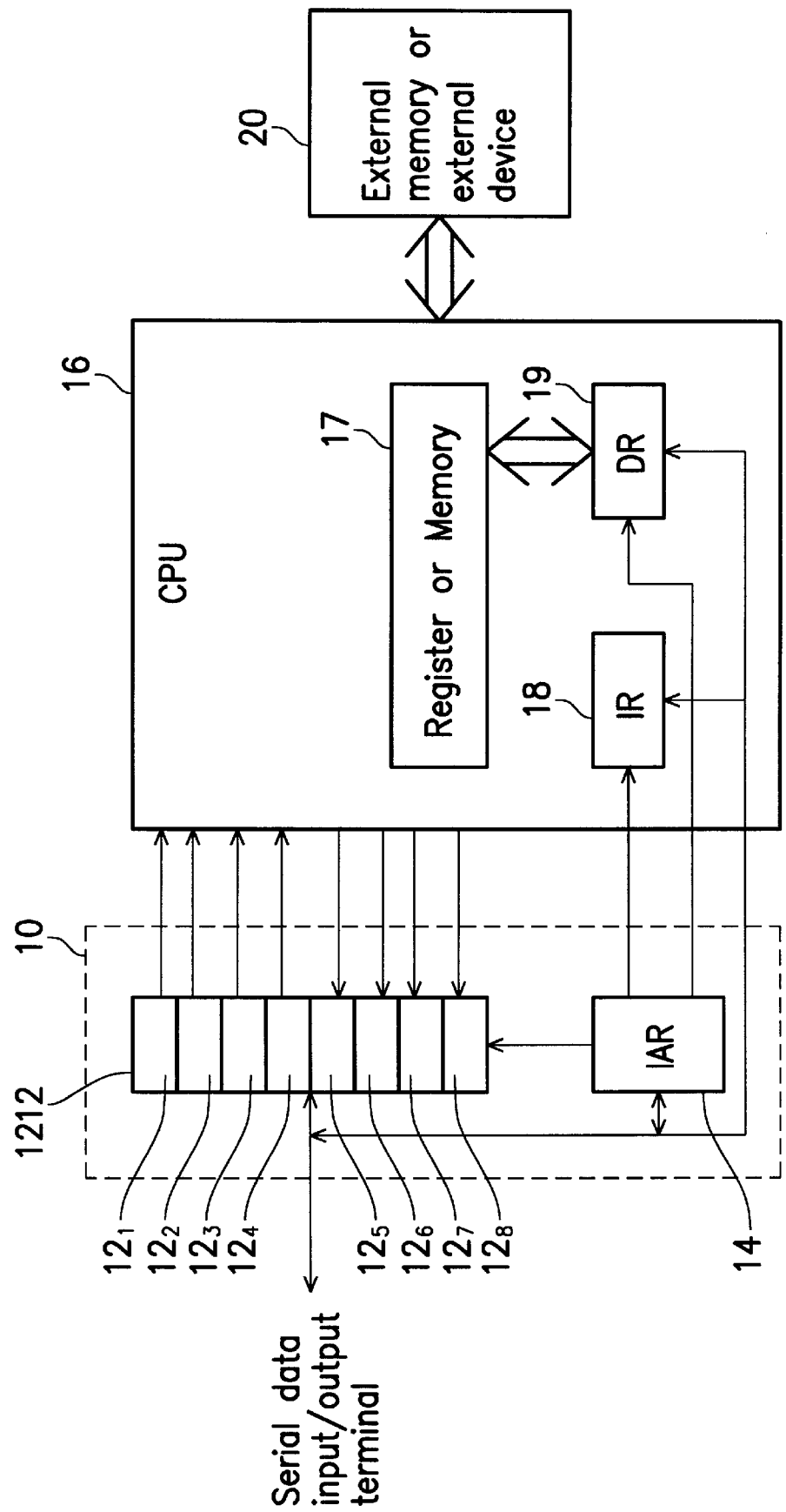
FIG. 1 is a schematic view illustrating a serial in-circuit emulator according to the invention.

Referring to FIG. 1, a schematic view illustrating a serial in-circuit emulator 10 of the invention is shown. To debug software programs, a serial in-circuit emulator (ICE) 10 according to the invention can pause the operation of a CPU 16 to read/write current data from/to a register of the CPU 16 or to modify current data in a register of the CPU 16. Furthermore, the serial in-circuit emulator 10 can also read/write current data from/to an external memory or other external device 20, or modify these data. Besides, the serial in-circuit emulator 10 can change the process of running software programs from a continuously-executing mode into a step-by-step executing mode. In general, the CPU 16 has an instruction register (IR) 18 and a debugging register (DR) 19 into which a corresponding debugging interface is allowed to read/write. The serial in-circuit emulator 10 comprises:

an 8-bit serial in-circuit emulator control register (ICR) 12 for controlling the CPU 16, which includes:

(1) a first flag $12_1$ connected to the CPU 16 to reset the CPU 16;

(2) a second flag $12_2$ connected to the CPU 16 to force the CPU 16 to enter a temporarily halted state;

(3) a third flag $12_3$ connected to the CPU 16 to force the pipeline of the CPU 16 to jump to the next stage;

(4) a fourth flag $12_4$ connected to the CPU 16 to force the CPU 16 to return to a normal state;

(5) a fifth flag $12_5$ and a sixth flag $12_6$ connected to the CPU 16 to check whether the CPU is in a normal state, an external memory bus cycle state or a temporarily halted state;

(6) a seventh flag $12_7$ connected to the CPU 16 to check whether the data of an external memory 20 is transferred to a register 17 or whether the data of the register 17 is transferred to the external memory 20; and (7) an eighth flag $12_8$ connected to the CPU 16 to check whether the data of the debugging register 19 is transferred to the register 17 or whether the data of the register 17 is transferred to the debugging register 19.

a 2-bit serial in-circuit emulator address register (IAR) 14 for addressing the serial in-circuit control register 19, the instruction register 18 of the CPU 16 and the debugging register 19 to read/write; and a serial data input/output terminal connected to the serial in-circuit emulator control register 12 and the serial in-circuit address register 14, as well as the instruction register 18 of the CPU and the debugging register 19. The serial data output/input terminal can be controlled by a general serial interface (not shown). In order to make the operations of the serial in-circuit emulator according to the invention clearer, some examples will be provided for further description.

Figure 2:
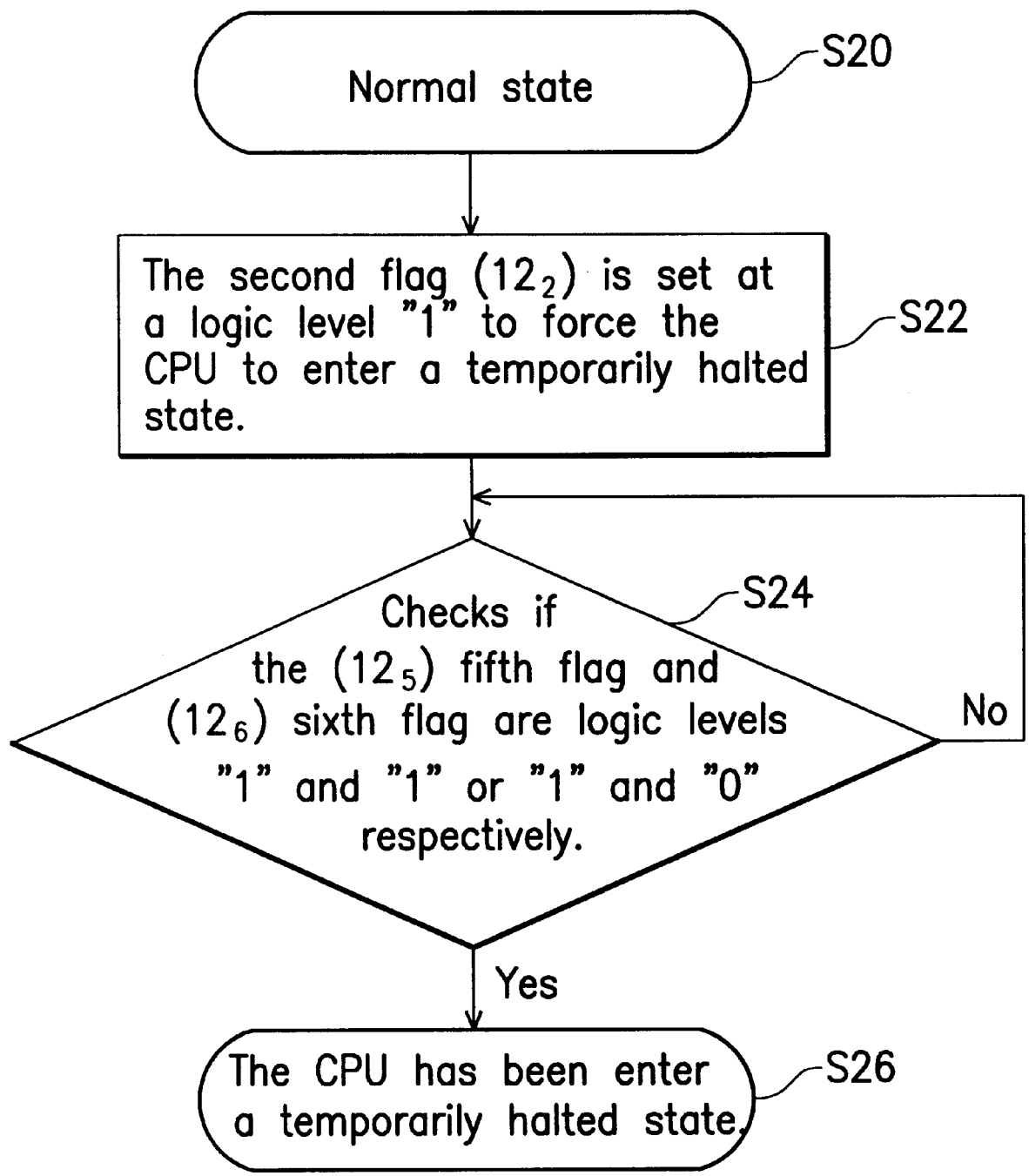
FIG. 2 is a flow chart illustrating how to force a CPU to enter a temporarily halted state by use of a serial in-circuit emulator according to the invention.

FIG. 2 is a flow chart illustrating how to force the CPU 16 to enter a temporarily halted state by use of the serial in-circuit emulator according to the invention. As shown in FIG. 2, in step 20, the CPU 16 is in a normal state. Next, continuing onto step 22, the second flag $12_2$ of the serial in-circuit emulator control register 12 is set to a logic level "1" to force the CPU 16 to enter a temporarily halted state. Then, continuing on going to step 24, a checks is make to see if the fifth flag $12_5$ and sixth flag $12_6$ of the serial in-circuit emulator control register 12 are logic levels "1" and "1" or "1" and "0," respectively. In other words, determination is make as to whether the CPU 16 is in a temporarily halted state. If the CPU 16 is not in a temporarily halted state, then step 24 continuously executes. However, if the CPU is in a temporarily halted state, the process advances to step 26 which indicates that the CPU has been entered a temporarily halted state.

Figure 3:
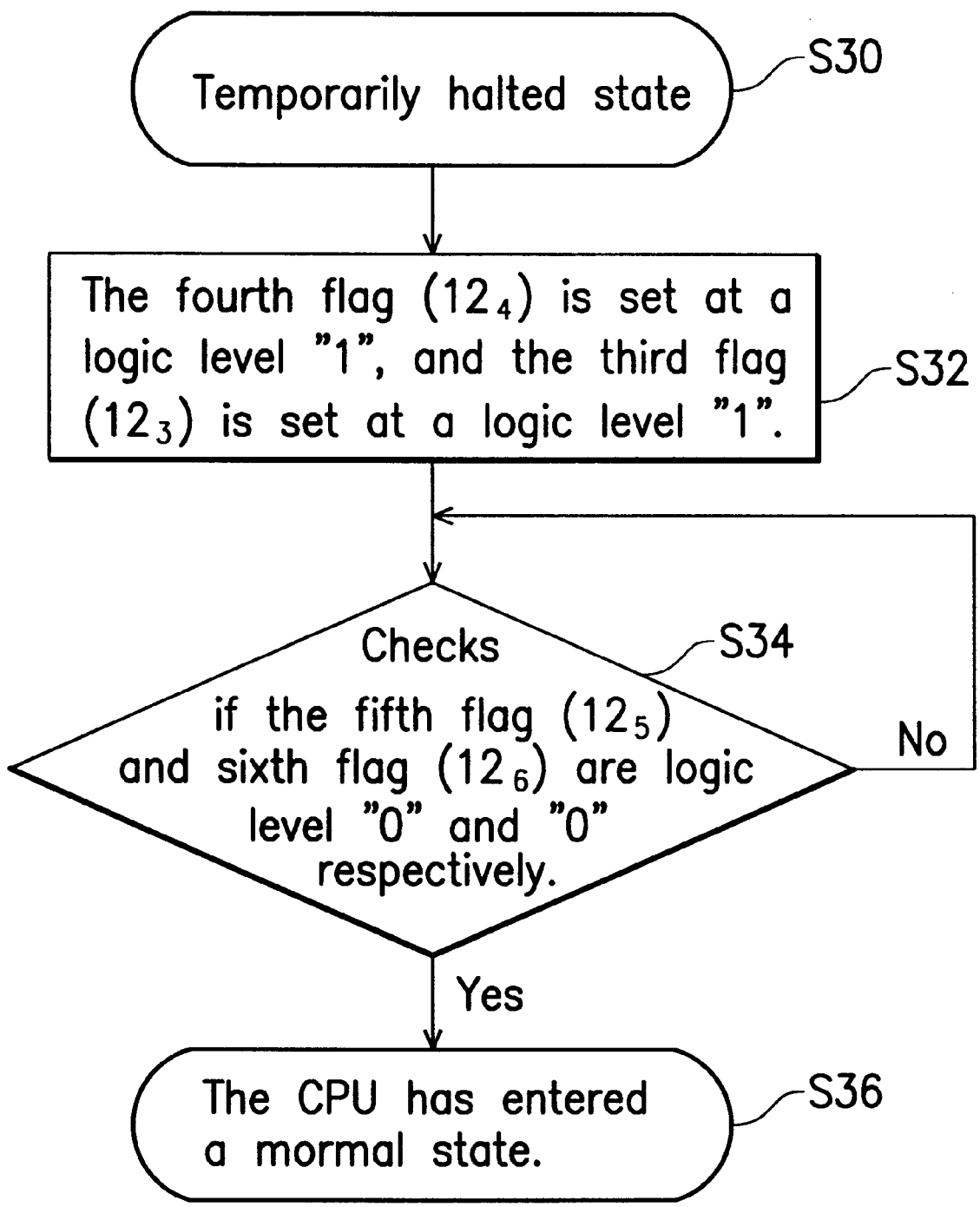
FIG. 3 is a flow chart illustrating how to force a CPU to return to a normal state by use of a serial in-circuit emulator according to the invention.

FIG. 3 is a flow chart illustrating how to force the CPU 16 to return to a normal state by use of the serial in-circuit emulator according to the invention. As shown in FIG. 3, in step 30, the CPU 16 is in a temporarily halted state. Next, continuing onto step 32, the fourth flag $12_4$ of the serial in-circuit emulator control register 12 is set to a logic level "1" to force the CPU 16 to return to a normal state, and the third flag $12_3$ of the serial in-circuit emulator control register 12 is set to a logic level "1" to cause the CPU pipeline to jump to the next stage. Then, continuing onto step 34, a check is make to determine whether the fifth flag $12_5$ and sixth flag $12_6$ of the serial in-circuit emulator control register 12 are logic levels "0" and "0," respectively. In other words, a determine is made of whether the CPU is in a normal state. If the CPU is not in a normal state, step 34 is continuously executed. However, if the CPU is in a normal state, the process advances to step 36 which indicates that the CPU has returned to a normal state.

Figure 4:
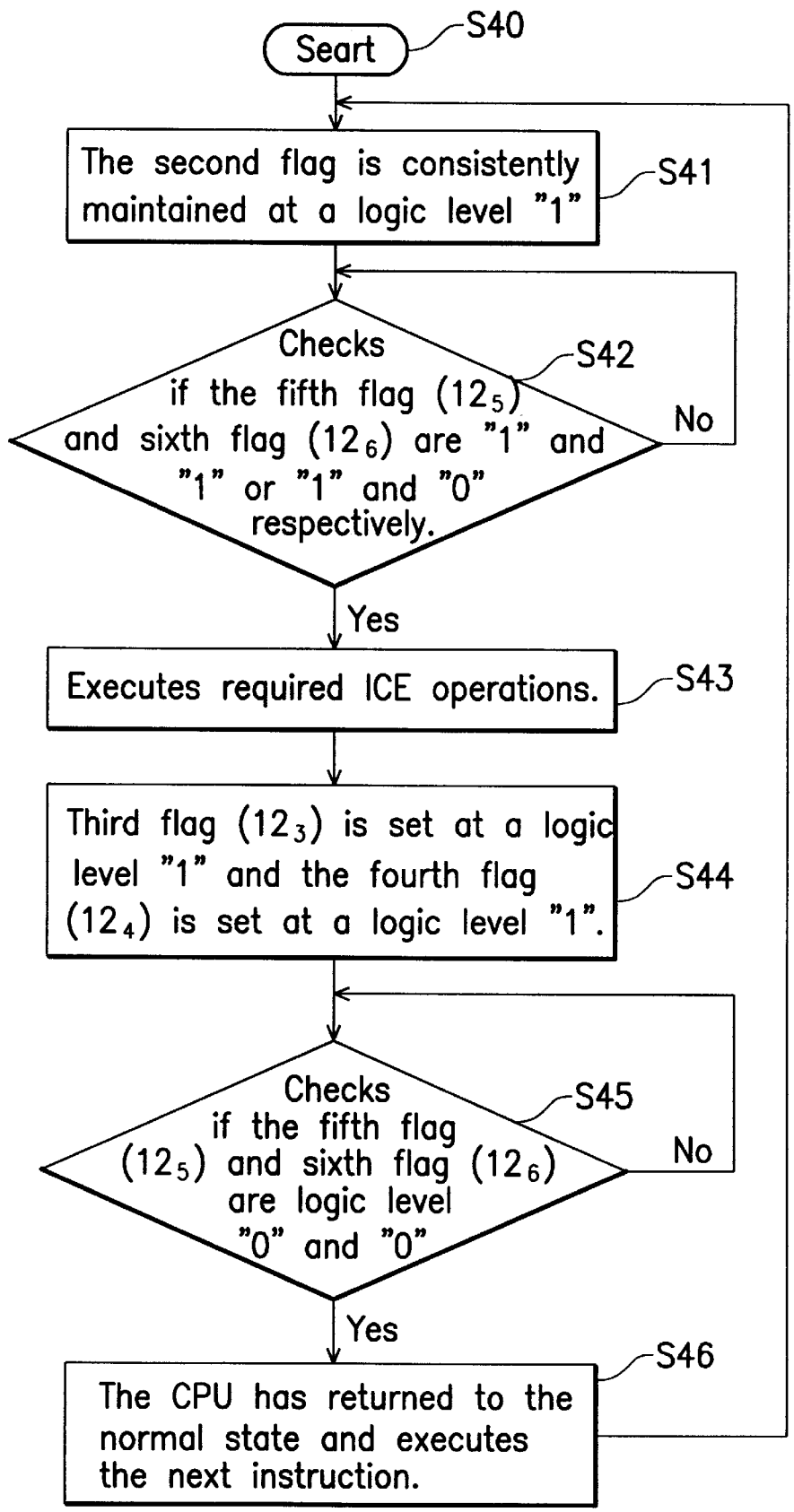
FIG. 4 is a flow chart illustrating how to execute a hardware single-stepping by use of a serial in-circuit emulator according to the invention.

FIG. 4 is a flow chart illustrating how to execute a hardware single stepping by use of the serial in-circuit emulator according to the invention, in which regardless of whether the CPU 16 is been entered a temporarily halted state or a normal state, the second flag $12_2$ of the serial in-circuit emulator control register 12 is always maintained at a logic level "1." As shown in FIG. 4, step 40 is a beginning. Next, going to step 41, the second flag $12_2$ of the serial in-circuit emulator control register 12 is consistently maintained at a logic level "1." Next, going to step 42, a check is made to determine whether the fifth flag $12_5$ and sixth flag $12_6$ of the serial in-circuit emulator control register 12 are logic levels "1" and "1" or logic levels "1" and "0," respectively. In other words, identifies if the CPU 16 is in a temporarily halted state. If the CPU 16 is not in a temporarily halted state, step 42 is continuously executed. Conversely, if the CPU 16 is in a temporarily halted state, the process advances to step 43 to execute required operations of the serial in-circuit emulator. Then, continuing onto step 44, the third flag $12_3$ of the serial in-circuit emulator control register 12 is set to a logic level "1" to cause the CPU pipeline to jump to the next stage, and the fourth flag $12_4$ of the serial in-circuit emulator control register 12 is set to a logic level "1" to force the CPU 16 to return to a normal state. After that, continuing onto step 45, a check is make to determine whether the fifth flag $12_5$ and sixth flag $12_6$ of the serial in-circuit emulator control register 12 are logic levels "0" and "0", respectively. In other words, determination is made of whether the CPU has been at a normal state. If the CPU is not in a normal state, continuously executes step 45. On the contrary, if the CPU is in a normal state, the CPU will execute the next instruction, and then enter a temporarily halted state again, because the second flag $12_2$ is constantly maintained at a logic level "1." The above-mentioned operations will be repeated over and over.

Figure 5:
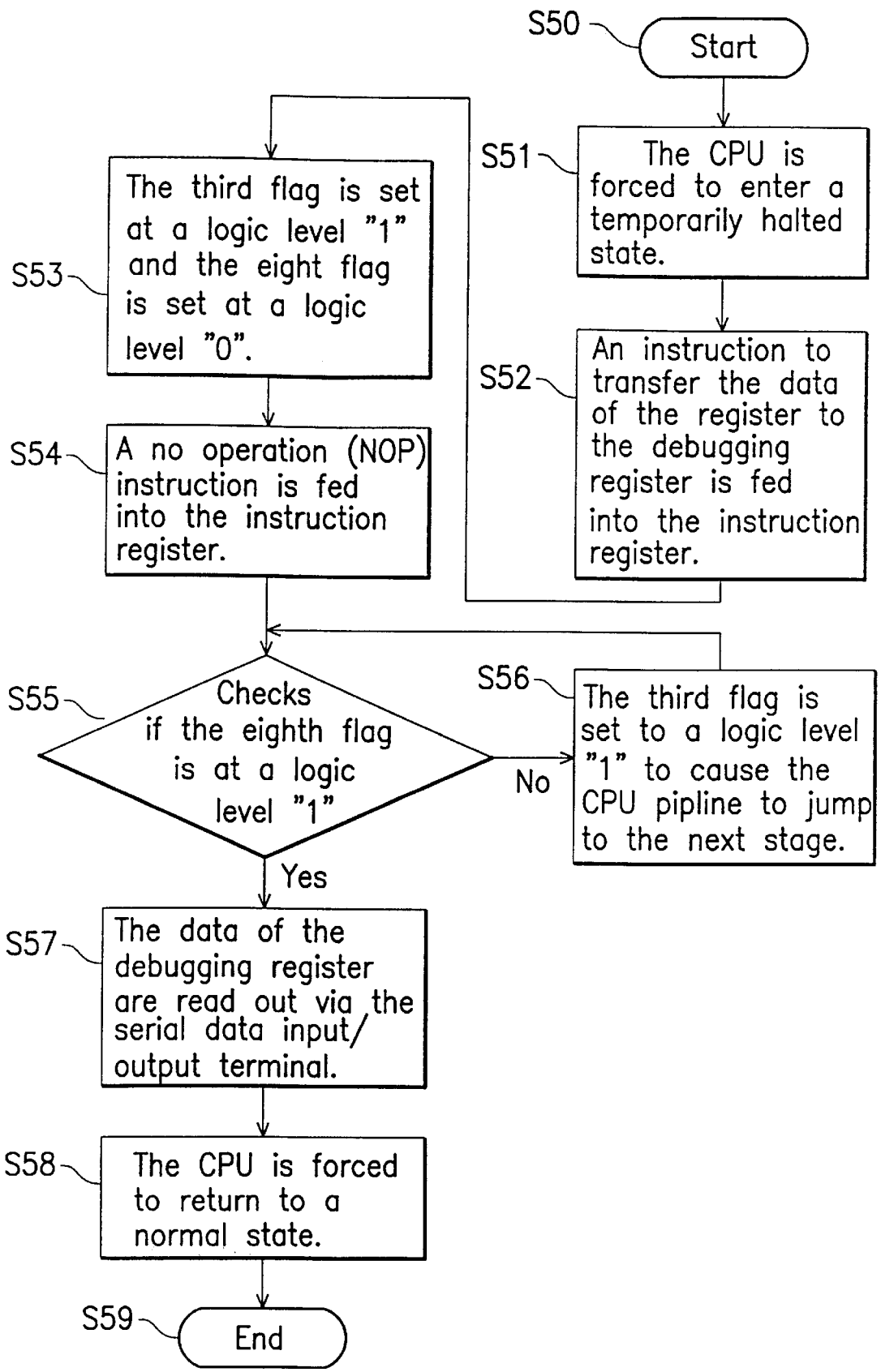
FIG. 5 is a flow chart illustrating how to read data from an internal register of a CPU by use of a serial in-circuit emulator according to the invention.

FIG. 5 is a flow chart illustrating how to read the data in an internal register of the CPU 16 by use of the serial in-circuit emulator according to the invention. As shown in FIG. 5, step 50 is a beginning. Next, continuing onto step 51, the second flag $12_2$ of the serial in-circuit emulator control register 12 is set to a logic level "1" to force the CPU 16 to enter a temporarily halted state. Then, going to step 52, an instruction to transfer the data in the register 17 of the CPU 16 to the debugging register 19 is fed into the instruction register 18. After that, continuing onto step 53, the third flag $12_3$ of the serial in-circuit emulator control register 12 is set to a logic level "1" to cause the CPU pipeline to jump to the next stage, and the eighth flag $12_8$ of the serial in-circuit emulator register 12 is set to a logic level "0." Next, continuing onto step 54, a "no operation (NOP)" instruction is fed into the instruction register 18. Then, continuing to step 55, a check is made to determine whether the eight flag $12_8$ of the serial in-circuit emulator control register 12 is a logic level "1." In other words, a determination is made of whether the data of the register 17 is transferred to the debugging register 19. If the data of the register has not been transferred to the debugging register 19, continuing onto step 56, the third flag $12_3$ of the serial in-circuit emulator control register 12 is set to a logic level "1" to cause the CPU's pipeline to jump to the next stage, and then the process proceeds to step 55. Conversely, if the data of the register has been transferred to the debugging register 19, continuing onto step 57, the data of the debugging register 19 via the serial data input/output terminal is read. Next, continuing onto step 58, the CPU 16 is forced to return to a normal state. Finally, continuing to step 58, the operation ends.

Figure 6:
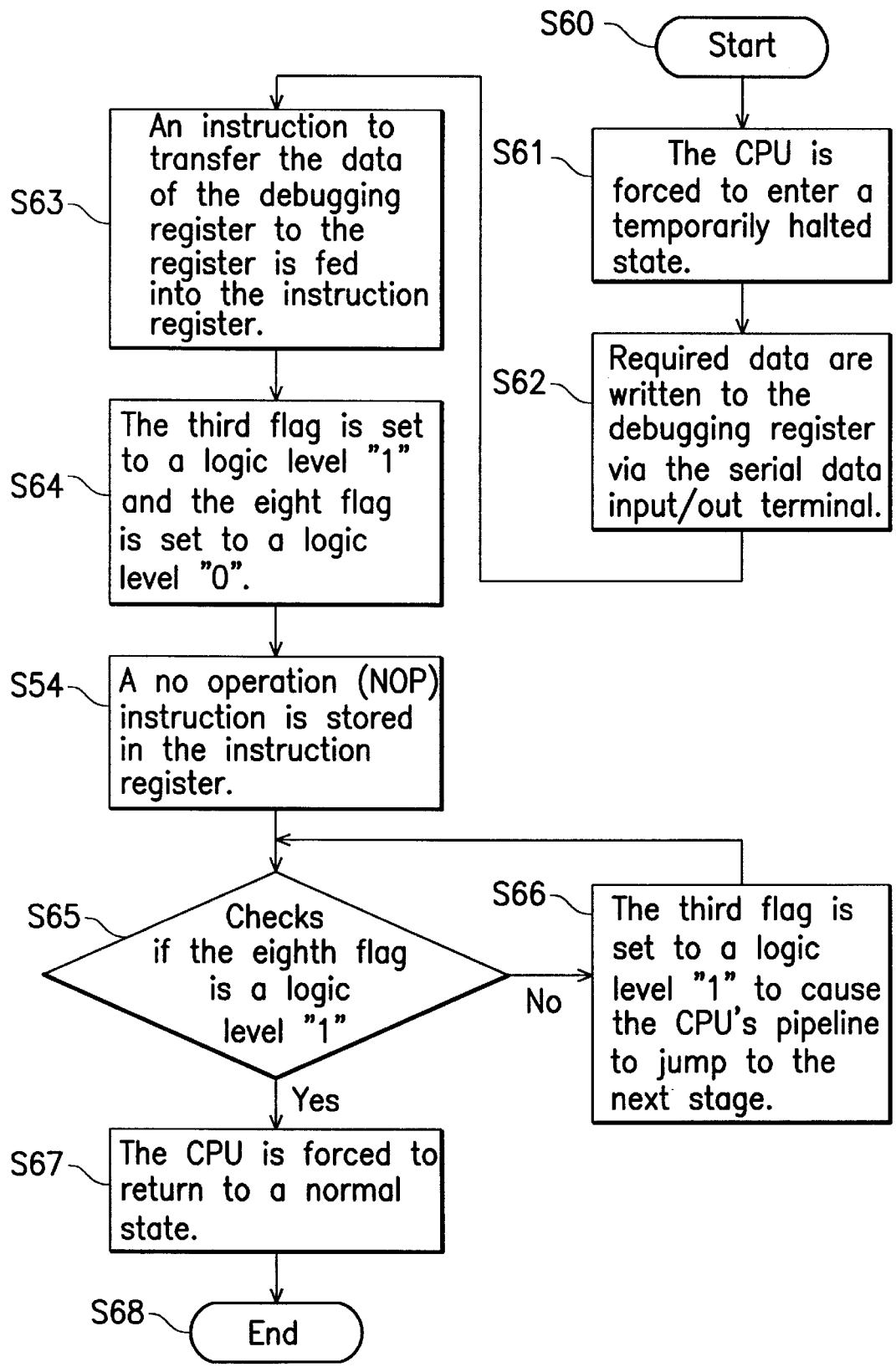
FIG. 6 is a flow chart illustrating how to update the data in a register of a CPU by use of a serial in-circuit emulator according to the invention.

FIG. 6 is a flow chart illustrating how to update the data in a register of the CPU 16 by use of the serial in-circuit emulator according to the invention. As shown in FIG. 6, step 60 is a beginning. Continuing onto step 61, the CPU 16 is forced to enter a temporarily halted state. Then, continuing onto step 62, the required data are shifted into the debugging register 19 via the serial data input/output terminal. Subsequently, continuing onto step 63, an instruction to transfer the data of the debugging register to the register 17 is fed in the instruction register 18. Next, continuing onto step 64, the third flag $12_3$ of the serial in-circuit emulator control register 12 is set to a logic level "1" to cause the pipeline of the CPU 16 to jump to the next stage, and the eighth flag $12_8$ of the serial in-circuit emulator control register 12 is set to a logic level "0." Then, going to step 54, a "no operation (NOP)" instruction is fed into the instruction register 18. Continuing to step 65, a check is made to determine whether the eighth flag $12_8$ of the serial in-circuit emulator control register 12 is a logic level "1". In other words, a determination is made as to whether the data of the debugging register 19 is transferred to the register 17. If the data of the debugging register 19 is not transferred to the register 17, continuing onto step 66, the third flag $12_3$ of the serial in-circuit emulator control register 12 is set to a logic level "1" to cause the CPU 16 to jump to the next step, and then the process advances to step 65. Conversely, if the data of the debugging register 19 is transferred to the register 17, continuing onto step 67, the CPU 16 is forced to return to a normal state. Finally, continuing onto step 68, the operation ends.

Figure 7:
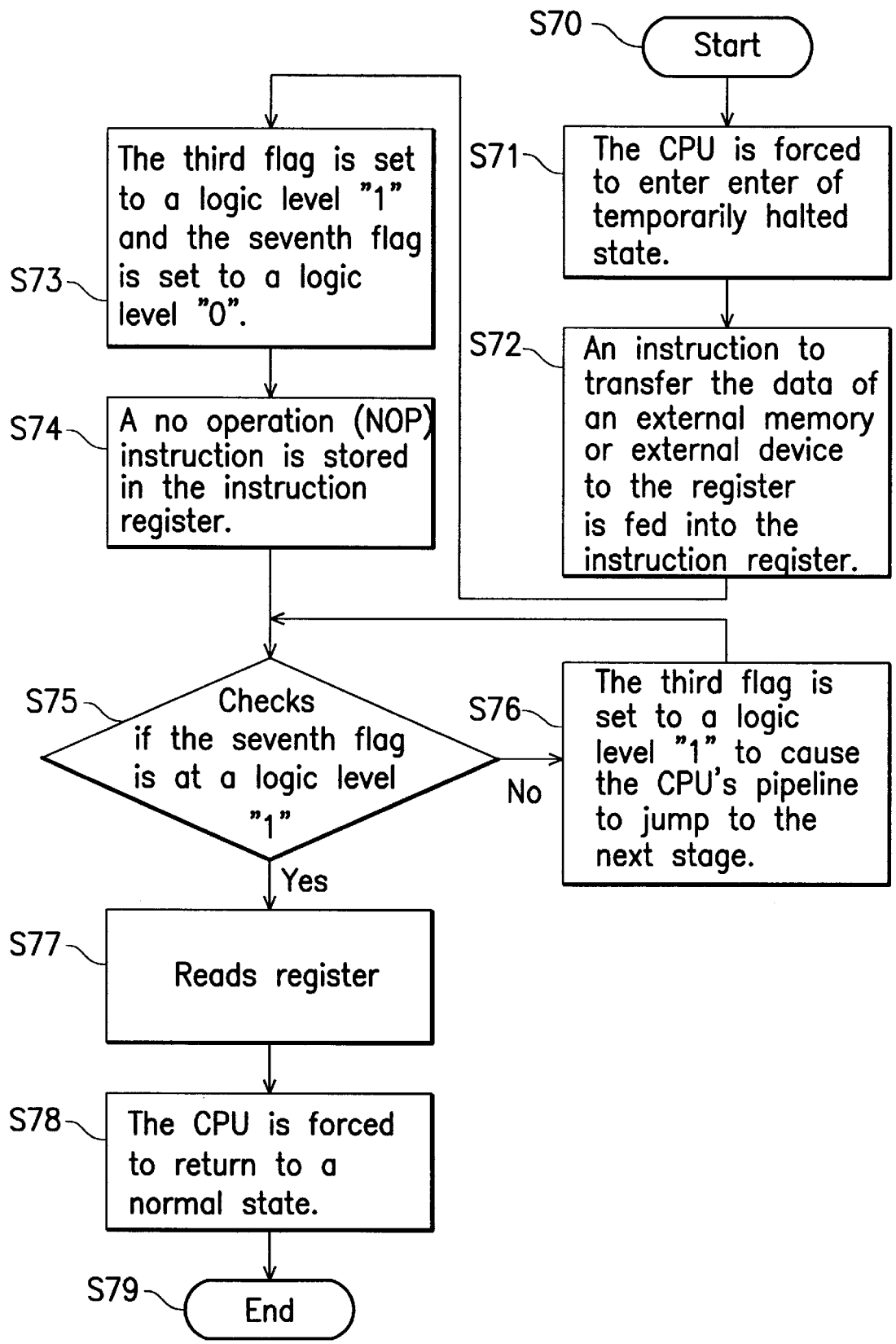
FIG. 7 is a flow chart illustrating how to read the data of an external memory by use of a serial in-circuit emulator according to the invention.

FIG. 7 is a flow chart illustrating how to read the data of an external memory or external device by use of the serial in-circuit emulator of the invention. As shown in FIG. 7, step 70 is a beginning. Continuing onto step 71, the second flag $12_2$ of the serial in-circuit emulator control register 12 is set to a logic level "1" to force the CPU 16 to enter a temporarily halted state. Next, going to step 72, an instruction to transfer the data of the external memory or other external devices 20 to the register 17 of the CPU 16" is fed into the instruction register 18. Then, continuing onto step 73, the third flag $12_3$ of the serial in-circuit emulator control register 12 is set to a logic level "1" to cause the pipeline of the CPU 16 to jump to the next stage, and the seventh flag $12_7$ of the serial in-circuit emulator control register 12 is set to a logic level "0." Subsequently, continuing onto step 74. a "no operation (NOP)" instruction is fed into the instruction register 18. Continuing onto step 75, a check is made to determine whether the seventh flag $12_7$ of the serial in-circuit emulator control register 12 is a logic level "1." In other words, a determination is made as to whether the data of the external memory or external device 20 are transferred to the register 17. If the data of the external memory or external device 20 are not transferred to the register 17, continuing onto step 76, the third flag $12_3$ of the serial in-circuit emulator control register 12 is set to a logic level "1" to cause the CPU pipeline to jump to a next stage, and then the process advances to step 75. Conversely, if the data of the external memory or external device 20 are transferred to the register 17, continuing onto step 77, the data of the register is read according to the flow chart as shown in FIG. 4. After that, continuing onto step 78, the CPU 16 is forced to return to a normal state. Finally, continuing onto step 79, the operation ends.

Figure 8:
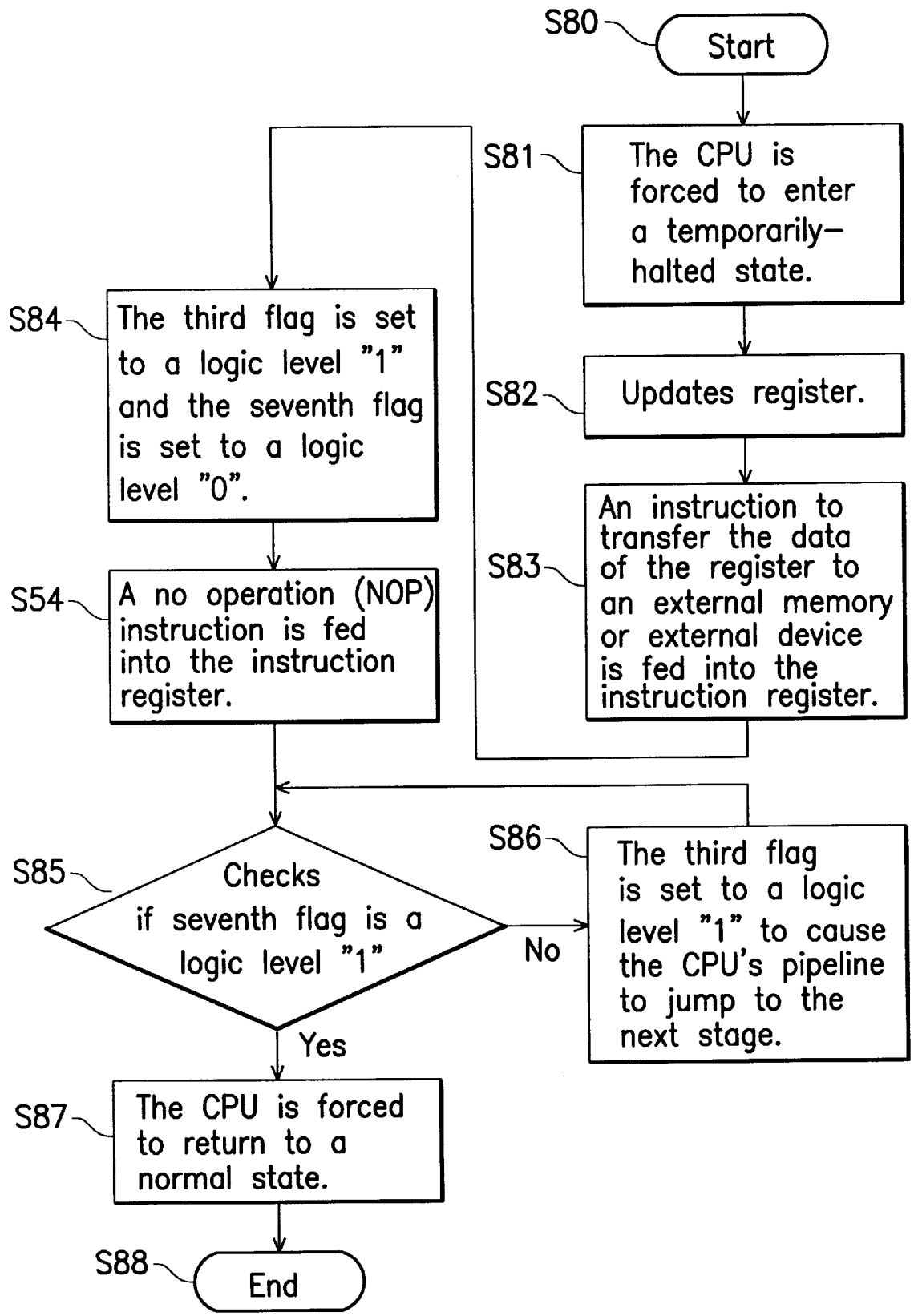
FIG. 8 is a flow chart illustrating how to update the data of an external memory by use of a serial in-circuit emulator according to the invention.

FIG. 8 is a flow chart illustrating how to update the data of the external memory by use of the serial in-circuit emulator of the invention. As shown in FIG. 8, step 80 is a beginning. Next, continuing onto step 81, the CPU 16 is forced to enter a temporarily halted state. Continuing onto step 82, the data of the register 17 is updated according to the flow chart of FIG. 5. Then, continuing onto step 83, an instruction to transfer the data of the register 17 to the external memory or external device 20 is fed into the instruction register 18. Next, continuing onto step 84, the third flag $12_3$ of the serial in-circuit emulator control register 12 is set to a logic level "1" to cause the CPU pipeline to jump to the next stage, and the seventh flag $12_7$ of the serial in-circuit emulator control register 12 is set to a logic level "0." Continuing onto step 54, a no operation instruction (NOP) is fed into the instruction register. Thereafter, continuing onto step 85, checks if the seventh flag $12_7$ of the serial in-circuit emulator control register 12 is a logic level "1." In other words, a determination is made as to whether the data of the register 17 are transferred to the external memory or another external device 20. If the data of the register 17 are not transferred to the external memory or another external device 20, continuing onto step 86, the third flag $12_3$ of the serial in-circuit emulator control register 12 is set to a logic level "1" to cause the CPU's pipeline to jump to the next stage, then going to step 85 again. Conversely, if the data of the register 17 has been transferred to the external memory or external device 20, continuing onto step 87, the CPU 16 is forced to return to a normal state. Finally, continuing onto step 88, this operation ends.

In summary, since the serial in-circuit emulator according to the invention can be easily integrated with different types of CPUs without modifying the original design of each CPU, the operation speed of the CPUs can not be affected. Furthermore, this serial in-circuit emulator requires a modest amount of hardware resources. That is, the serial in-circuit emulator merely requires a serial in-circuit emulator control register and a serial in-circuit emulator address register. Therefore, after the serial in-circuit emulator is integrated with a CPU, the cost of the entire chip is hardly increased at all.

Although the invention has been disclosed in terms of a preferred embodiment, the disclosure is not intended to limit the invention. Those knowledgeable in the art can make modifications within the scope and spirit of the invention which is determined by the claims below.

What is claimed is:

1. A serial in-circuit emulator which can pause the operation of a CPU to read/write or modify the data of a register of said CPU, an external memory or an external device, wherein said CPU has an instruction register and a debugging register by which said serial in-circuit emulator can read/write required data, comprising:

a serial in-circuit emulator control register for controlling said CPU, which includes:
    a first flag region connected to said CPU to reset said CPU;
    a second flag region connected to said CPU to force said CPU to enter a temporarily halted state;
    a third flag region connected to said CPU to force said CPU's pipeline to jump to a next stage;

a fourth flag region connected to said CPU to force said CPU to return to a normal state;

a fifth flag region and sixth flag region connected to said CPU to identify whether said CPU is in a normal state, an external memory bus cycle state or a temporarily halted state;

a seventh flag region connected to said CPU to check whether the data of said external memory or external device are transferred to said register, or the data of said register are transferred to said external memory or external device;

an eighth flag region connected to said CPU to check whether the data of said debugging register are transferred to said register or the data of said register are transferred to said debugging register;

a serial in-circuit emulator address register which can address said serial in-circuit emulator control register, said instruction register of said CPU, and said debugging register to read/write required data; and a serial data input/output terminal connected to said serial in-circuit emulator control register, said instruction register of said CPU, and said debugging register.

2. A serial in-circuit emulator as claimed in claim 1, wherein said serial in-circuit emulator can transmit data parallel-to-serial and serial-to-parallel.

3. A serial in-circuit emulator as claimed in claim 1, wherein each of said first flag region, second flag region, third flag region, fourth flag region, fifth flag region, sixth flag region, seventh flag region and eighth flag region consists of one bit.

4. A serial in-circuit emulator as claimed in claim 3, wherein when said first flag region is a logic level "1", said CPU is reset.

5. A serial in-circuit emulator as claimed in claim 3, wherein when said second flag region is a logic level "1," said CPU is forced to enter said temporarily halted state.

6. A serial in-circuit emulator as claimed in claim 3, wherein when said third flag region is a logic level "1," said CPU's pipeline is forced to jump to the next stage.

7. A serial in-circuit emulator as claimed in claim 3, wherein when said fourth flag region is a logic level "1," said CPU is forced to return to said normal state.

8. A serial in-circuit emulator as claimed in claim 3, wherein when said fifth flag region and sixth flag region are logic levels "0" and "0" respectively, it means that said CPU is in said normal state.

9. A serial in-circuit emulator as claimed in claim 3, wherein when said fifth flag reign and sixth flag region are logic levels "0" and "1," respectively, it means that said CPU is in said external memory bus cycle state.

10. A serial in-circuit emulator as claimed in claim 3, wherein when said fifth flag region and sixth flag region are logic levels "1" and "0," respectively, it means that said CPU is in said temporarily halted state.

11. A serial in-circuit emulator as claimed in claim 3, wherein when said seven flag region is a logic level "1," it means that the data of said external memory or external device are transferred to said register, or the data of said register are transferred to said external memory or external device.

12. A serial in-circuit emulator as claimed in claim 3, wherein when said eighth flag region is a logic level "1," it means that the data of said debugging register are transferred to said register, or the data of said register are transferred to said debugging register.

13. A serial in-circuit emulator as claimed in claim 1, wherein said serial in-circuit emulator address register consists of 2 bits.

14. A serial in-circuit emulator which can pause the operation of a CPU to read/write or modify the data of a register of said CPU, external memory or external device, wherein said CPU has an instruction register and a debugging register by which said serial in-circuit emulator can read/write required data, comprising:

a serial in-circuit emulator control register for controlling said CPU, which includes:

a first flag connected to said CPU to reset said CPU;

a second flag connected to said CPU to force said CPU to enter a temporarily-stopping state;

a third flag connected to said CPU to force said CPU's pipeline to jump to the next stage;

a fourth flag connected to said CPU to force said CPU to return to a normal state;

a fifth flag and sixth flag connected to said CPU to identify whether said CPU is in a normal state, an external memory period state or a temporarily halted state;

a seven flag connected to said CPU to check whether the data of said external memory or external device are transferred to said register, or the data of said register are transferred to said external memory or external device;

an eighth flag connected to said CPU to check whether the data of said debugging register are transferred to said register or the data of said register are transferred to said debugging register;

a serial in-circuit emulator address register which can address said serial in-circuit emulator control register, said instruction register of said CPU, and said debugging register to read/write required data; and a serial data input/output terminal connected to said serial in-circuit emulator control register, said instruction register of said CPU, and said debugging register.

15. A serial in-circuit emulator as claimed in claim 14, wherein said serial in-circuit emulator can transmit data parallel-to-serial and serial-to-parallel.

16. A serial in-circuit emulator as claimed in claim 14, wherein when said first flag is a logic level "1," said CPU is reset.

17. A serial in-circuit emulator as claimed in claim 14, wherein when said second flag is a logic level "1," said CPU is forced to enter said temporarily halted state.

18. A serial in-circuit emulator as claimed in claim 14, wherein when said third flag is a logic level "1," said CPU's pipeline is forced to jump to the next stage.

19. A serial in-circuit emulator as claimed in claim 14, wherein when said fourth flag is a logic level "1," said CPU is forced to return to said normal state.

20. A serial in-circuit emulator as claimed in claim 14, wherein when said fifth flag and sixth flag are logic levels "0" and "0," respectively, it means that said CPU is in said normal state.

21. A serial in-circuit emulator as claimed in claim 14, wherein when said fifth flag and sixth flag are logic levels "0" and "1," respectively, it means that said CPU is in said external memory bus cycle state.

22. A serial in-circuit emulator as claimed in claim 14, wherein when said fifth flag and sixth flag are logic levels "1" and "0," respectively, it means that said CPU is in said temporarily halted state.

23. A serial in-circuit emulator as claimed in claim 14, wherein when said seven flag is a logic level "1," it means that the data of said external memory or external device are transferred to said register, or the data of said register are transferred to said external memory or external device.

24. A serial in-circuit emulator as claimed in claim 14, wherein when said eighth flag is a logic level "1," it means that the data of said debugging register are transferred to said register, or the data of said register are transferred to said debugging register.

25. A serial in-circuit emulator as claimed in claim 14, wherein said serial in-circuit emulator address register consists of 2 bits.

* * * * *